US012060909B2

(12) United States Patent
Suzuki et al.

(10) Patent No.: US 12,060,909 B2
(45) Date of Patent: Aug. 13, 2024

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 100 days.

(21) Appl. No.: 17/784,604

(22) PCT Filed: Dec. 16, 2020

(86) PCT No.: PCT/JP2020/046869
§ 371 (c)(1),
(2) Date: Jun. 10, 2022

(87) PCT Pub. No.: WO2021/125201
PCT Pub. Date: Jun. 24, 2021

(65) Prior Publication Data
US 2023/0027772 A1    Jan. 26, 2023

(30) Foreign Application Priority Data

Dec. 17, 2019    (JP) .................................. 2019-227366

(51) Int. Cl.
*F16C 17/26* (2006.01)
*F16C 17/02* (2006.01)
(Continued)

(52) U.S. Cl.
CPC .......... *F16C 17/026* (2013.01); *F16C 17/045* (2013.01); *F16C 33/107* (2013.01); *F16J 15/3412* (2013.01)

(58) Field of Classification Search
CPC .. F16C 17/026; F16C 17/045; F16C 33/1065; F16C 33/107; F16C 33/74;
(Continued)

(56) References Cited

U.S. PATENT DOCUMENTS 3,695,789 A    10/1972    Jansson ........................... 418/75
3,945,776 A    3/1976    Morita .......................... 418/142
(Continued)

FOREIGN PATENT DOCUMENTS

CN    104685213    6/2015    ............. F04C 18/02
DE    3940258    10/1989    ............... F16J 15/34
(Continued)

OTHER PUBLICATIONS

International Preliminary Report on Patentability issued in PCT/JP2020/046867, dated May 17, 2022, 5 pages.
(Continued)

*Primary Examiner* — Phillip A Johnson
(74) *Attorney, Agent, or Firm* — HAYES SOLOWAY P.C.

(57) ABSTRACT

An annular sliding component has a sliding surface relatively sliding with eccentric rotation. The sliding surface is provided with a plurality of grooves each of which is open to a fluid space on at least one of an inner diameter side and an outer diameter side of the sliding surface and arranged in a circumferential direction. The groove is partially defined by a first side wall surface formed along the circumferential direction of the sliding surface and a second side wall surface connected to the first side wall surface and formed along a radial direction of the sliding surface.

21 Claims, 7 Drawing Sheets (51) Int. Cl.
*F16C 17/04* (2006.01)
*F16C 33/10* (2006.01)
*F16J 15/34* (2006.01)

(58) Field of Classification Search
CPC ............. F16C 2360/44; F16J 15/3412; F16J 15/3416; F16J 15/342; F04C 18/0215; F04C 29/0057; F04C 2240/54; F04C 2240/56

See application file for complete search history.

(56) References Cited

U.S. PATENT DOCUMENTS

| | | | | |
|---|---|---|---|---|
| 4,407,512 | A | 10/1983 | Trytek | 277/96.1 |
| 4,637,786 | A | 1/1987 | Matoba et al. | 418/55 |
| 4,734,020 | A * | 3/1988 | Inaba | F04C 29/0021 |
| | | | | 418/94 |
| 4,824,344 | A * | 4/1989 | Kimura | F16C 17/045 |
| | | | | 418/94 |
| 6,190,148 | B1 * | 2/2001 | Ni | F04C 29/02 |
| | | | | 418/55.6 |
| 9,759,216 | B2 | 9/2017 | Kato | F04C 29/028 |
| 2002/0021976 | A1 | 2/2002 | Riegger et al. | F01C 1/04 |
| 2015/0316093 | A1* | 11/2015 | Su | F04C 18/0215 |
| | | | | 384/123 |
| 2017/0146014 | A1 | 5/2017 | Ohta et al. | F04C 29/0021 |
| 2019/0169988 | A1 | 6/2019 | Tokunaga et al. | F01C 19/12 |
| 2020/0063560 | A1 | 2/2020 | Tokunaga et al. | F01C 19/08 |
| 2020/0332901 | A1 | 10/2020 | Imura | F16J 15/3412 |

FOREIGN PATENT DOCUMENTS

| | | | | |
|---|---|---|---|---|
| EP | 2740974 | 6/2014 | ............. | F16J 15/34 |
| JP | S52-36566 | 9/1977 | ............. | F02B 55/02 |
| JP | S61-8402 | 1/1986 | ............. | F01C 1/02 |
| JP | 2-16381 | 1/1990 | ............. | F04C 18/02 |
| JP | H4-632289 | 12/1992 | ............. | F04C 18/02 |
| JP | H8-210285 | 8/1996 | ............. | F04C 29/02 |
| JP | H9-88852 | 3/1997 | ............. | F04C 18/356 |
| JP | 2002-39287 | 2/2002 | ............. | F16H 1/32 |
| JP | 2002242858 | 8/2002 | ............. | F04C 18/02 |
| JP | 2006-316677 | 11/2006 | ............. | F04C 18/02 |
| JP | 2013-72371 | 4/2013 | ............. | F04C 15/00 |
| JP | 2016-61208 | 4/2016 | ............. | F04C 18/02 |
| JP | WO 2018/025629 | 2/2018 | ............. | F02B 55/02 |
| JP | WO 2018/097064 | 5/2018 | ............. | F01C 19/08 |
| JP | WO 2019/139107 | 7/2019 | ............. | F16J 15/34 |
| JP | 2019-196708 | 11/2019 | ............. | F04C 18/02 |

OTHER PUBLICATIONS

International Search Report and Written Opinion issued in PCT/JP2020/046867, dated Feb. 22, 2021, with English translation, 13 pages.
International Preliminary Report on Patentability issued in PCT/JP2020/046868, dated May 17, 2022, 4 pages.
International Search Report and Written Opinion issued in PCT/JP2020/046868, dated Mar. 2, 2021, with English translation, 11 pages.
International Preliminary Report on Patentability issued in PCT/JP2020/046869, dated May 17, 2022, 5 pages.
International Search Report and Written Opinion issued in PCT/JP2020/046869, dated Feb. 22, 2021, with English translation, 15 pages.
U.S. Appl. No. 17/783,256, filed Jun. 7, 2022, Suzuki et al.
U.S. Appl. No. 17/784,599, filed Jun. 10, 2022, Suzuki et al.
European Official Action issued in related Application Serial No. 20903690.4, dated Jan. 8, 2024, 9 pages.
European Official Action issued in related Application Serial No. 20903005.5, dated Nov. 15, 2023, 7 pages.
European Official Action issued in related Application Serial No. 20900996.8, dated Nov. 15, 2023, 7 pages.
Korean Official Action issued in related Application Serial No. 10-2022-7021205, dated Feb. 16, 2024 with translation, 10 pages.
Korean Official Action issued in related Application Serial No. 10-2022-7021620, dated Feb. 16, 2024 with translation, 10 pages.
Korean Official Action issued in related Application Serial No. 10-2022-7020767, dated Feb. 16, 2024 with translation, 10 pages.
Official Action issued in related U.S. Appl. No. 17/783,256, dated Jan. 22, 2024, 8 pages.

* cited by examiner

SLIDING COMPONENT

TECHNICAL FIELD

The present invention relates to a sliding component used in a rotating machine including an eccentric mechanism.

BACKGROUND ART

In the related art, a scroll compressor used in an automotive air conditioning system as an example of a rotating machine including an eccentric mechanism is provided with a scroll compression mechanism including a fixed scroll provided with a spiral lap on the surface of an end plate and a movable scroll provided with a spiral lap on the surface of an end plate, an eccentric mechanism eccentrically rotating a rotary shaft, and so on. In this mechanism, the movable scroll is slid relative to the fixed scroll with eccentric rotation by the rotation of the rotary shaft. As a result, the refrigerant supplied from a low-pressure chamber on the outer diameter side of both scrolls is pressurized and the high-pressure refrigerant is discharged from the discharge hole formed in the middle of the fixed scroll (see Patent Citation 1).

In addition, the scroll compressor illustrated in Patent Citation 1 is provided with a back pressure supply mechanism supplying a part of the refrigerant compressed by the scroll compression mechanism to a back pressure chamber formed on the back surface side of a thrust plate receiving the axial load of the movable scroll. The movable scroll is pressed toward the fixed scroll by the back pressure acting on the back surface of the movable scroll. As a result, the axial refrigerant leakage between the two scrolls is reduced and the compression efficiency of the scroll compressor is enhanced.

CITATION LIST

Patent Literature

Patent Citation 1: JP 2016-61208 A (Pages 5 to 6, FIG. 1)

SUMMARY OF INVENTION

Technical Problem

In the scroll compressor illustrated in Patent Citation 1, a seal ring is interposed between the thrust plate and a housing. As a result, the thrust plate can be axially moved while the back pressure is prevented from leaking out of the back pressure chamber. As a result, the movable scroll can be pressed toward the fixed scroll via the thrust plate. However, the sliding surface of the thrust plate is pressed against the back surface of the movable scroll, and thus the frictional resistance of the sliding surface is large and the operation of the movable scroll may be affected.

The present invention has been made in view of such a problem, and an object of the present invention is to provide a sliding component capable of reducing the frictional resistance of a sliding surface entailing eccentric rotation.

Solution to Problem

In order to solve the above problem, a sliding component according to the present invention is a sliding component formed in an annular shape and having a sliding surface relatively sliding with eccentric rotation, wherein the sliding surface is provided with a plurality of grooves each of which is open to a fluid space on at least one of an inner diameter side and an outer diameter side of the sliding surface and arranged in a circumferential direction, and each of the grooves is partially defined by a first side wall surface formed along the circumferential direction of the sliding surface and a second side wall surface connected to the first side wall surface and formed along a radial direction of the sliding surface. According to the aforesaid feature of the present invention, a fluid is capable of flowing in between sliding surfaces from the opening of the groove provided in the sliding surface relatively sliding with the eccentric rotation and dynamic pressure can be generated by the fluid colliding with the first and second side wall surfaces in accordance with the radial and circumferential components in the relative movement of the groove entailed by the eccentric rotation. Accordingly, by slightly separating the sliding surfaces from each other and forming a fluid film, the lubricity between the sliding surfaces is improved and the frictional resistance of the sliding surface can be reduced.

It may be preferable that each of the grooves has a corner portion formed by an end of the first side wall surface and an end of the second side wall surface, the corner portion being angular. According to this preferable configuration, the fluid that has moved along the first and second side wall surfaces in the groove is capable of flowing out between the sliding surfaces from the vertex of the corner portion and the vicinity thereof, and thus high dynamic pressure can be generated in the corner portion.

It may be preferable that the first side wall surface is a circular arc surface having a circular center which coincides with a center of the sliding surface and the second side wall surface is a radial surface extending from the center of the sliding surface. According to this preferable configuration, the radial component in the relative movement of the groove entailed by the eccentric rotation collides with the first side wall surface, the circumferential component collides with the second side wall surface, and thus dynamic pressure is generated with ease by each side wall surface.

It may be preferable that each of the grooves has a circumferential length larger than a radial length thereof. According to this preferable configuration, the fluid easily flows in between the sliding surfaces from the opening of the groove. In addition, the component in the circumferential direction causes the fluid in the groove to collide with the second side wall surface and high dynamic pressure can be generated even in a state where the radial component in the relative movement of the groove entailed by the eccentric rotation does not act on the first side wall surface.

It may be preferable that each of the grooves is open to a space on the inner diameter side. According to this preferable configuration, the fluid flowing into the groove from the opening of the groove is easily held in the groove by the centrifugal force.

It may be preferable that each of the grooves is open to a space on a high-pressure side. According to this preferable configuration, a fluid easily flows into the groove from the opening of the groove using the pressure of the fluid, and thus a higher dynamic pressure can be generated.

It may be preferable that the sliding component is one of a pair of relatively sliding components having a radial width smaller than a radial width of another one of the pair of relatively sliding components. According to this preferable configuration, dynamic pressure can be reliably generated by the groove between the sliding surfaces sliding relative to each other with eccentric rotation.

BRIEF DESCRIPTION OF DRAWINGS

FIG. 3 is a diagram illustrating relative sliding between the sliding surface of the side seal and a sliding surface of a thrust plate in the embodiment of the present invention. It should be noted that FIG. 3A illustrates the start position of the relative sliding and FIGS. 3B to 3D illustrate the positional relationships between the relatively sliding surfaces of the side seal and the thrust plate at an eccentric rotary shaft rotation of 90, 180, and 270 degrees, respectively.

DESCRIPTION OF EMBODIMENTS

A mode for implementing the sliding component according to the present invention will be described below based on an embodiment.

Embodiment

The sliding component according to the embodiment will be described with reference to FIGS. 1 to 4. In the drawings, the groove formed in the sliding surface of the sliding component or the like is dotted for convenience of description.

The sliding component of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

Figure 1:
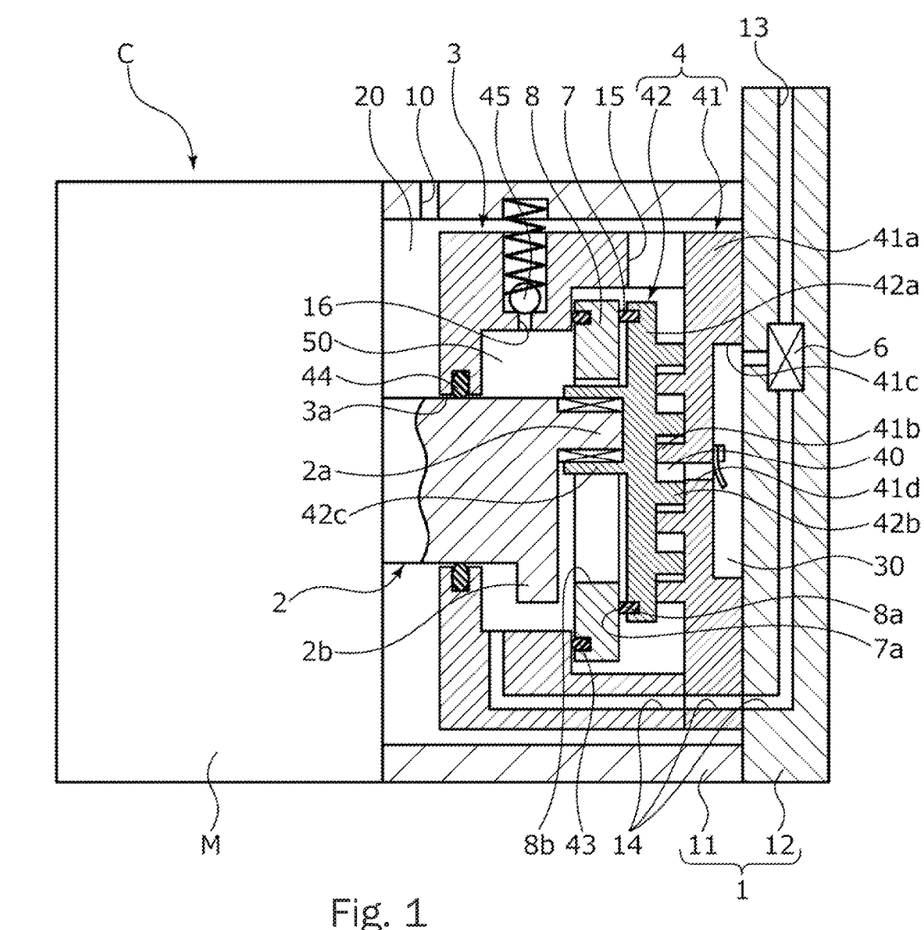
FIG. 1 is a schematic configuration diagram illustrating a scroll compressor to which a side seal as a sliding component according to an embodiment of the present invention is applied.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20 where a low-pressure refrigerant is supplied through a suction port 10 from a refrigerant circuit (not illustrated), a high-pressure chamber 30 where a high-pressure refrigerant compressed by the scroll compression mechanism 4 is discharged, and a back pressure chamber 50 where a part of the refrigerant compressed by the scroll compression mechanism 4 is supplied together with lubricating oil. It should be noted that the back pressure chamber 50 is formed in the cylindrical inner casing 3 accommodated in the casing 11.

Formed in the cover 12 is a discharge communication passage 13 for communication between the refrigerant circuit (not illustrated) and the high-pressure chamber 30. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one end of the inner casing 3 abutting against an end plate 41a of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 fixed to the cover 12 in a substantially sealed shape and a movable scroll 42 accommodated in the inner casing 3.

The fixed scroll 41 is made of metal and includes a spiral lap 41b projecting from the surface of the disk-shaped end plate 41a, that is, one end surface of the end plate 41a. In addition, a recessed portion 41c recessed on the inner diameter side of the back surface of the end plate 41a, that is, the other end surface of the end plate 41a is formed in the fixed scroll 41 and the high-pressure chamber 30 is defined from the recessed portion 41c and the end surface of the cover 12.

The movable scroll 42 is made of metal and includes a spiral lap 42b projecting from the surface of a disk-shaped end plate 42a, that is, one end surface of the end plate 42a. In addition, a boss 42c protruding from the middle of the back surface of the end plate 42a, that is, the other end surface of the end plate 42a is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides relative to the fixed scroll 41 with the eccentric rotation. At this time, the movable scroll 42 rotates eccentrically with respect to the fixed scroll 41. With this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
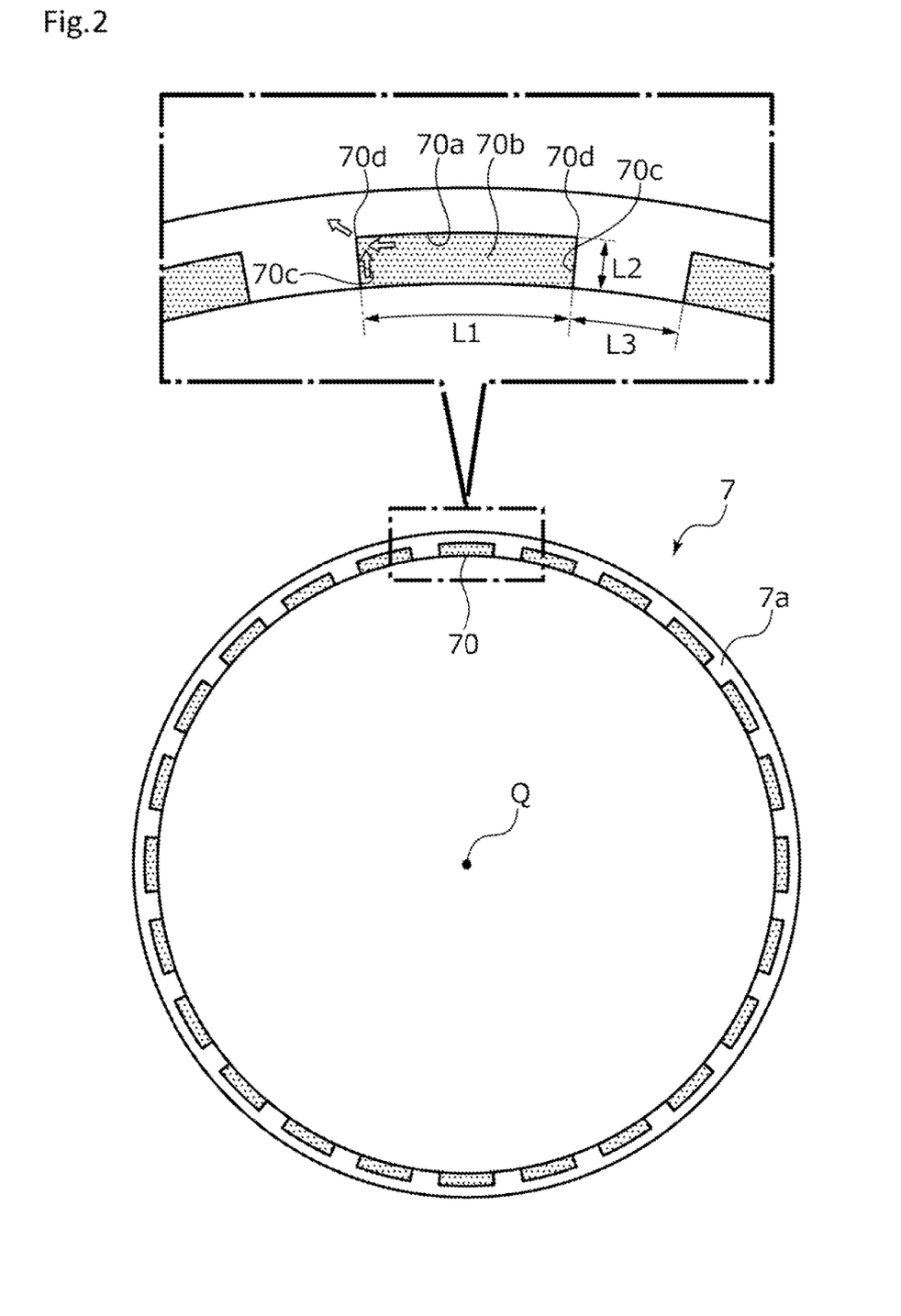
FIG. 2 is a diagram illustrating a sliding surface of the side seal in the embodiment of the present invention.

Next, the side seal 7 as a sliding component in the present embodiment will be described. As illustrated in FIGS. 1 and 2, the side seal 7 is made of resin, has a rectangular cross section and an annular shape in the axial direction, and is fixed to the back surface of the end plate 42a of the movable scroll 42. A sliding surface 7a abutting against a sliding surface 8a of the thrust plate 8 is formed on one side surface of the side seal 7.

As illustrated in FIG. 2, in the sliding surface 7a of the side seal 7, a plurality of grooves 70 open on the space on the inner diameter side, that is, the back pressure chamber 50 are equally arranged in the circumferential direction. It should be noted that the number of the grooves 70 may be any number and yet the number is preferably 10 or more in order to obtain the effect of dynamic pressure generation by second side wall surfaces 70c and 70c (described later).

The groove 70 is formed as a rectangular groove having a circumferential dimension L1 longer than a radial dimension L2 (L1>L2). Specifically, the groove 70 includes a first side wall surface 70a as a circular arc surface extending in the axial direction so as to be orthogonal to the flat sliding surface 7a and having its center at a center Q of the sliding surface 7a, the second side wall surfaces 70c and 70c as radial surfaces extending in the axial direction so as to be orthogonal to the sliding surface 7a and extending from the center Q of the sliding surface 7a, and a planar bottom surface 70b extending in parallel to the sliding surface 7a.

In addition, the groove 70 has corner portions 70d and 70d with both circumferential ends of the first side wall surface 70a and the outer diameter ends of the second side wall surfaces 70c and 70c connected so as to be substantially orthogonal to each other. In other words, the groove 70 includes an angular wall surface including the first side wall surface 70a and the second side wall surfaces 70c and 70c.

It should be noted that the bottom surface 70b of the groove 70 is not limited to the planar bottom surface extending in parallel to the sliding surface 7a and may be formed as, for example, an inclined surface or a curved surface.

In addition, the circumferential dimension L1 of the groove 70 is longer than a circumferential dimension L3 of the land part between the adjacent grooves 70 (i.e., L1>L3). In other words, the plurality of grooves 70 are densely formed over the circumferential direction of the sliding surface 7a and the opening area of the groove 70 into which the fluid flows from the space on the inner diameter side of the sliding surface 7a is large.

In addition, the groove 70 is formed as a rectangular groove where the circumferential dimension L1 is longer than the radial dimension L2 (i.e., L1>L2) and the fluid holding capacity of the groove 70 is large.

As illustrated in FIG. 1, the thrust plate 8 is made of metal and has an annular shape, a seal ring 43 is fixed to one end surface of the thrust plate 8, and the seal ring 43 abuts against the inner peripheral surface of the inner casing 3. As a result, the thrust plate 8 functions as a thrust bearing that receives the axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is formed as a closed space by sealing between the back pressure chamber 50 and the rotary shaft 2 inserted through a through hole 3a by a seal ring 44, which is fixed to the inner periphery of the through hole 3a provided in the middle of the other end of the inner casing 3. In addition, the back pressure communication passage 14 formed over the cover 12, the fixed scroll 41, and the inner casing 3 and allowing the high-pressure chamber 30 and the back pressure chamber 50 to communicate with each other is provided with an orifice (not illustrated) and the refrigerant in the high-pressure chamber 30 is supplied, after pressure-decreasing adjustment by the orifice, to the back pressure chamber 50 together with the lubricating oil separated by the oil separator 6. At this time, the pressure in the back pressure chamber 50 is adjusted so as to become higher than the pressure in the low-pressure chamber 20. It should be noted that a pressure release hole 16 penetrating the inner casing 3 in the radial direction and allowing the low-pressure chamber 20 and the back pressure chamber 50 to communicate with each other is formed in the inner casing 3 and a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b has the size of a diameter that allows eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 3).

Figure 3:
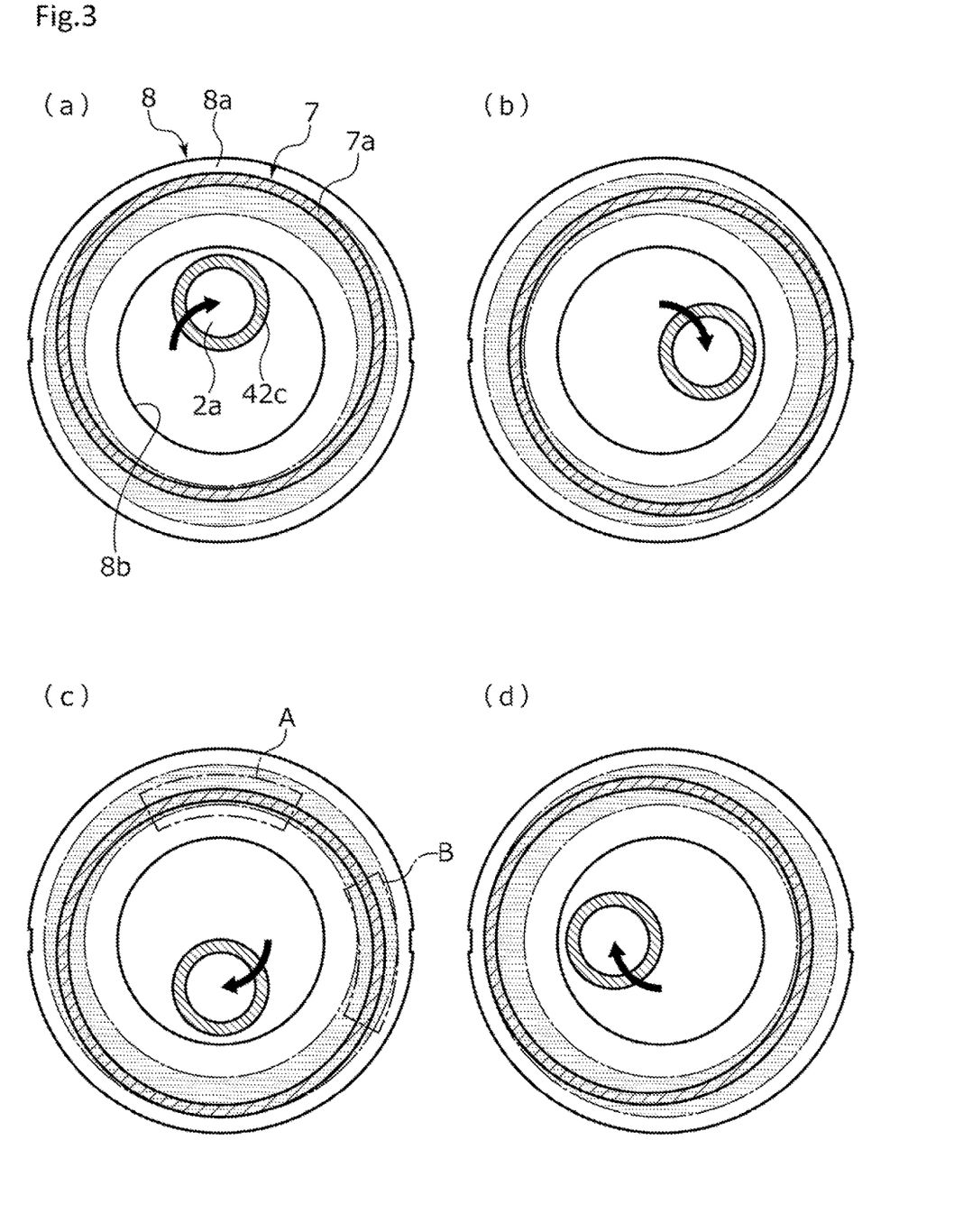
Figure 4:
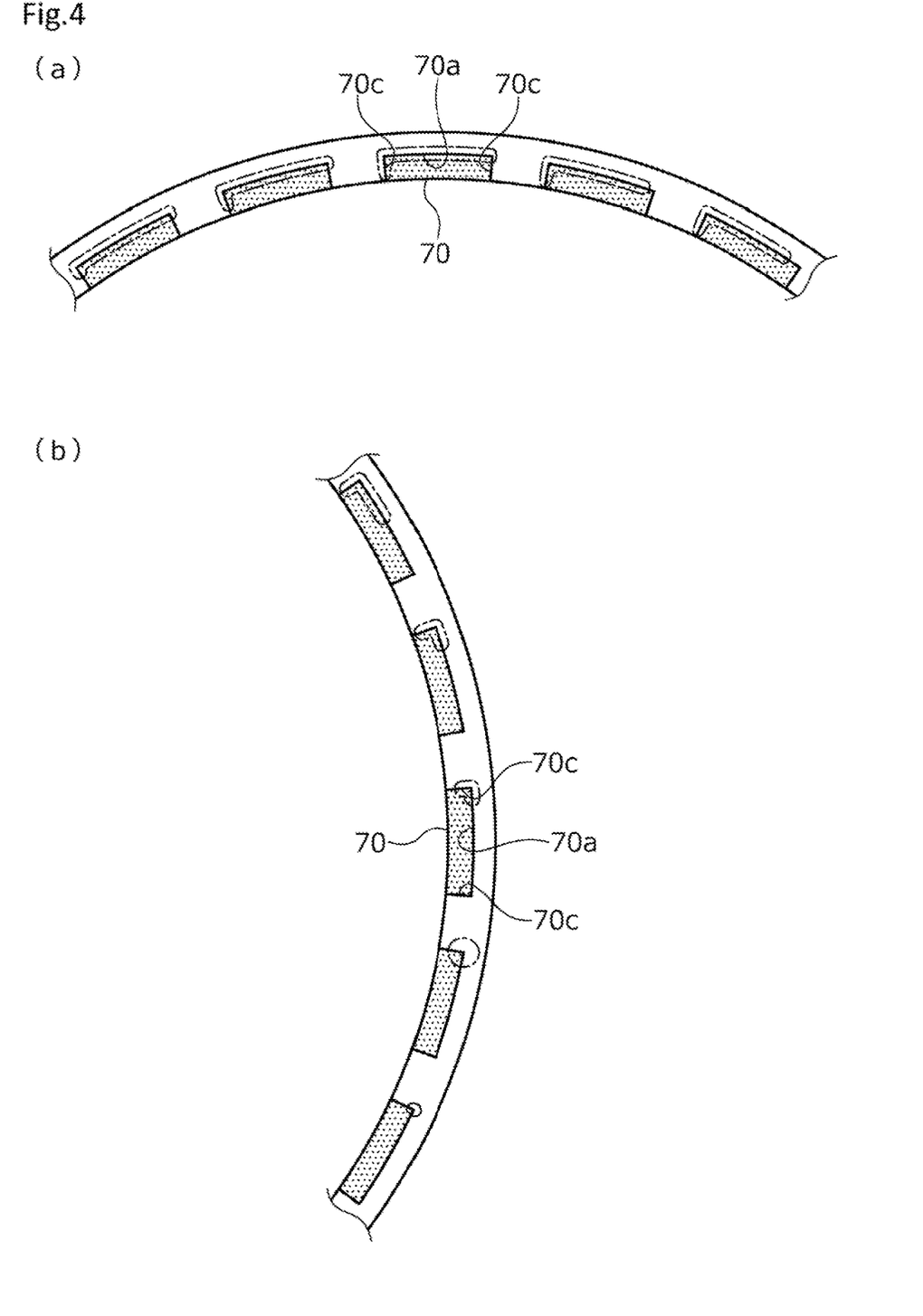
FIG. 4A is a partially enlarged view illustrating the distribution of the pressure that is generated in a plurality of grooves as a result of the relative movement of the groove entailed by the eccentric rotation of the rotary shaft in a region A of the sliding surface of the side seal illustrated in FIG. 3C.
FIG. 4B is a partially enlarged view illustrating the distribution of the pressure that is generated in the plurality of grooves as a result of the relative movement of the groove entailed by the eccentric rotation of the rotary shaft in a region B of the sliding surface of the side seal illustrated in FIG. 3C.

It should be noted that FIGS. 3A to 3D in FIG. 3 illustrate the rotational trajectory of the boss 42c that is viewed from the fixed scroll 41 (see FIG. 1) side. Respectively illustrated in FIGS. 3B to 3D are the boss 42c rotated by 90 degrees, 180 degrees, and 270 degrees with FIG. 3A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation, the plurality of grooves 70 open on the fluid-present back pressure chamber 50 on the inner diameter side are provided in the circumferential direction in the sliding surface 7a of the side seal 7, and the groove 70 is configured by connecting the first side wall surface 70a extending along the circumferential direction of the sliding surface 7a and the second side wall surfaces 70c and 70c extending along the radial direction. According to this, a fluid is capable of flowing in between the sliding surfaces 7a and 8a from the opening of the groove 70 provided in the sliding surface 7a relatively sliding with the eccentric rotation and dynamic pressure can be generated by the fluid colliding with the first side wall surface 70a and the second side wall surfaces 70c and 70c in accordance with the radial and circumferential components in the relative movement (see FIG. 3) of the groove 70 entailed by the eccentric rotation. Accordingly, by slightly separating the sliding surfaces 7a and 8a from each other and forming a liquid film attributable to lubricating oil, the lubricity between the sliding surfaces 7a and 8a is improved and the frictional resistance of the sliding surface 7a can be reduced.

In addition, the plurality of grooves 70 are provided in the circumferential direction of the sliding surface 7a, and thus dynamic pressure can be generated by the plurality of grooves 70 in accordance with the relative movement of the groove 70 entailed by the eccentric rotation. In addition, the distribution of the pressure generated in the plurality of grooves 70 as a result of the relative movement of the groove 70 entailed by the eccentric rotation of the rotary shaft 2 (see FIG. 4) moves in a substantially circumferential direction with the eccentric rotation. Accordingly, the fluid that has flowed between the sliding surfaces 7a and 8a out of the groove 70 upstream in the circumferential direction as a result of dynamic pressure generation easily flows into the adjacent groove 70 downstream in the circumferential direction and a liquid film attributable to lubricating oil is easily formed over the circumferential direction between the sliding surfaces 7a and 8a. It should be noted that the region in FIG. 4 surrounded by the chain line on the first side wall surface 70a or the second side wall surface 70c of each groove 70 indicates where pressure is generated in each groove 70.

In addition, although the fluid in the groove 70 collides with the first side wall surface 70a, the second side wall surface 70c, or both by the groove 70 relatively moving with the eccentric rotation and the fluid flows out between the sliding surfaces 7a and 8a and dynamic pressure is generated as a result, the position where the pressure is highest in each groove 70 changes in accordance with the rotation angle of the boss 42c illustrated in FIG. 3. In other words, although the position where the pressure is highest in each groove 70 differs depending on the rotation angle of the boss 42c, the plurality of grooves 70 are equally arranged in the circumferential direction of the sliding surface 7a, and thus variations in the dynamic pressure that is generated in the circumferential direction between the sliding surfaces 7a and 8a can be suppressed.

In addition, in the groove 70, the angular corner portions 70d and 70d are formed by connecting the first side wall surface 70a and the second side wall surfaces 70c and 70c. According to this, as illustrated in the enlarged portion of FIG. 2, the fluid (indicated by the white arrow) that has moved along the first side wall surface 70a and the second side wall surfaces 70c and 70c in the groove 70 is capable of flowing out between the sliding surfaces 7a and 8a from the vertices of the corner portions 70d and 70d and the vicinity thereof, and thus high dynamic pressure can be generated in the corner portions 70d and 70d.

In addition, the first side wall surface 70a is a circular arc surface having its center at the center Q of the sliding surface 7a (see FIG. 2) and the second side wall surfaces 70c and 70c are radial surfaces extending from the center Q of the sliding surface 7a. According to this, the flow of the fluid in the groove 70 in the relative movement of the groove 70 entailed by the eccentric rotation includes radial and circumferential components, the radial component collides with the first side wall surface 70a, the circumferential component collides with the second side wall surface 70c, and thus dynamic pressure is generated with ease on the respective side wall surfaces 70a and 70c.

Hereinafter, the flow of the fluid in the groove 70 in the state of FIG. 3C and so on will be outlined by taking the grooves 70 disposed on the upper, right, lower, and left sides of FIG. 2 as examples.

The groove 70 disposed above will be described. As for the groove 70 with a large amount of radial components in the direction toward the center Q in terms of the amount of movement per unit time entailed by the eccentric rotation (such as the groove 70 at the point of FIG. 4A), the groove 70 is long in the circumferential direction, and thus the pressure-receiving area of the first side wall surface 70a with respect to the radial component in the relative movement of the groove 70 entailed by the eccentric rotation is large and the fluid in the groove 70 collides with the first side wall surface 70a and generates dynamic pressure with ease. In addition, the fluid easily flows in from the opening of the groove 70 and the fluid that has flowed into the groove 70 collides with the first side wall surface 70a and flows out between the sliding surfaces 7a and 8a with ease.

Next, the groove 70 disposed on the right side will be described. As for the groove 70 with a large amount of components rotating clockwise around the center Q in terms of the amount of movement per unit time entailed by the eccentric rotation (such as the groove 70 at the point of FIG. 4B), the first side wall surface 70a extends in parallel to the circumferential component of the direction of rotation in the relative movement of the groove 70 entailed by the eccentric rotation, and thus the fluid in the groove 70 moves along the first side wall surface 70a and collides with the second side wall surface 70c with ease and dynamic pressure is generated with ease.

Next, the groove 70 disposed below will be described. As for the groove 70 with a large amount of radial components in the direction away from the center Q in terms of the amount of movement per unit time entailed by the eccentric rotation (such as the groove 70 provided below in FIG. 2), the fluid in the groove 70 is more likely to flow out from the opening of the groove 70 to the space on the inner diameter side than between the sliding surfaces 7a and 8a and almost no dynamic pressure is generated.

It should be noted that the groove 70 disposed on the left side has a substantially point-symmetrical disposition in relation to the right groove 70 described above in the sliding surface 7a and thus detailed description thereof will be omitted.

As described above, the component in the circumferential direction causes the fluid in the groove 70 to collide with the second side wall surface 70c and high dynamic pressure can be generated even in a state where the radial component in the relative movement of the groove 70 entailed by the eccentric rotation is unlikely to act on the first side wall surface 70a, examples of which include a state where the right and left grooves 70 described above are in the state of rotation that is illustrated in FIG. 3C. Accordingly, high dynamic pressure can be generated in a wide circumferential range between the sliding surfaces 7a and 8a.

In addition, the groove 70 is open on the space on the inner diameter side, and thus the fluid that has flowed into the groove 70 from the opening of the groove 70 is easily held in the groove 70 by the centrifugal force. Accordingly, poor lubrication is unlikely to occur between the sliding surfaces 7a and 8a and a liquid film attributable to lubricating oil is formed with ease.

In addition, the groove 70 is open toward the back pressure chamber 50, which is higher in pressure than the low-pressure chamber 20. As a result, a fluid easily flows into the groove 70 from the opening of the groove 70 using the pressure of the fluid. Accordingly, a higher dynamic pressure can be generated in the groove 70.

In addition, the radial width of the side seal 7 where the groove 70 is formed in the sliding surface 7a is smaller than the radial width of the relatively sliding thrust plate 8 (see FIGS. 1 and 3). According to this, between the sliding surfaces 7a and 8a sliding relative to each other with the eccentric rotation, the entire sliding surface 7a of the side seal 7 is always positioned in the sliding region between the sliding surface 7a of the side seal 7 and the sliding surface 8a of the thrust plate 8 (See FIG. 3). As a result, dynamic pressure can be reliably generated by the groove 70.

Although an embodiment of the present invention has been described above with reference to the drawings, the specific configurations are not limited to the embodiment and any changes or additions within the scope of the present invention are included in the present invention.

Although an aspect in which the side seal 7 as a sliding component is applied to the scroll compressor C used in the air conditioning system of an automobile or the like has been described in the above embodiment, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

Figure 5:
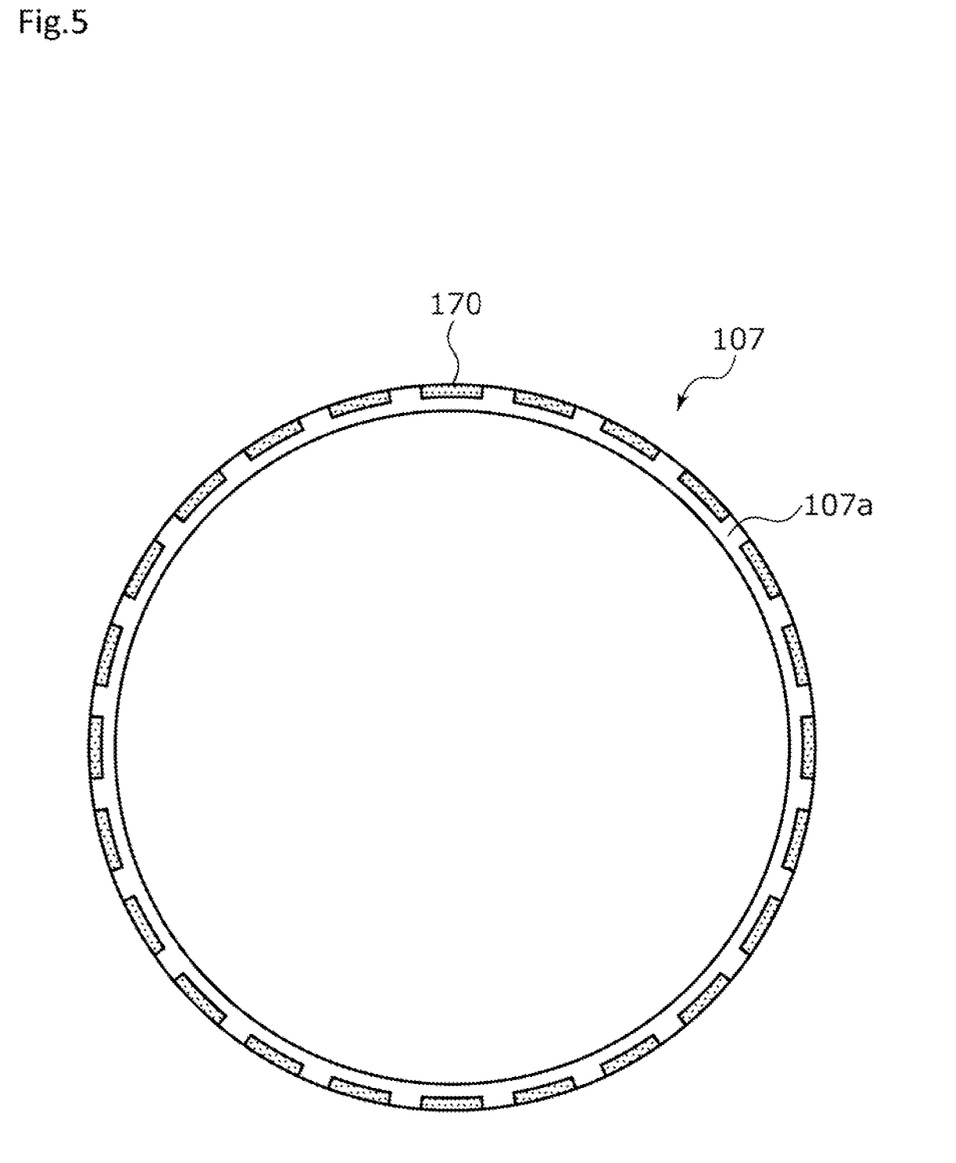
FIG. 5 is a diagram illustrating a first modification example of the groove formed in the sliding surface of the side seal in the embodiment.

In addition, although an aspect in which the groove 70 formed in the sliding surface 7a of the side seal 7 is open on the space on the inner diameter side has been described in the above embodiment, the present invention is not limited thereto. As in a side seal 107 of a first modification example illustrated in FIG. 5, a plurality of grooves 170 open on the space on the outer diameter side may be equally arranged in the circumferential direction of a sliding surface 107a.

Figure 6:
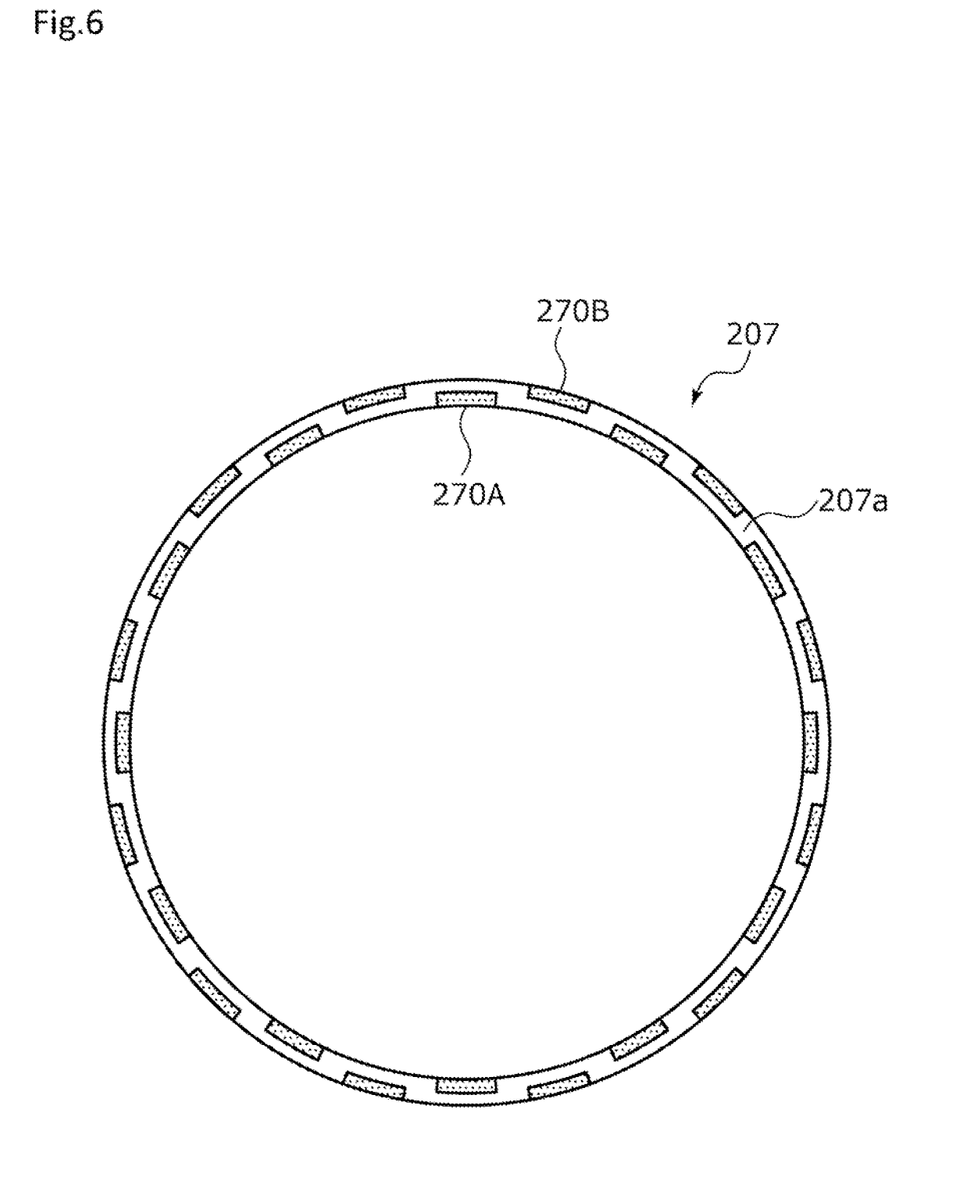
FIG. 6 is a diagram illustrating a second modification example of the groove formed in the sliding surface of the side seal in the embodiment.

In addition, as in a side seal 207 of a second modification example illustrated in FIG. 6, grooves 270A open on the inner diameter side and grooves 270B open on the outer diameter side may be alternately formed in the circumferential direction of a sliding surface 207a.

In addition, although the groove 70 in the above embodiment is formed by the corner portions 70d and 70d between the first side wall surface 70a and the second side wall surfaces 70c and 70c being angular at substantially right angles, the present invention is not limited thereto. The groove may be any in which the first side wall surface extending in the circumferential direction along the inner periphery of the sliding surface and the second side wall surface extending in the radial direction are connected. For example, the corner portion between the first and second side wall surfaces may be angular with an acute angle as in a third modification example illustrated in FIG. 7A.

Figure 7:
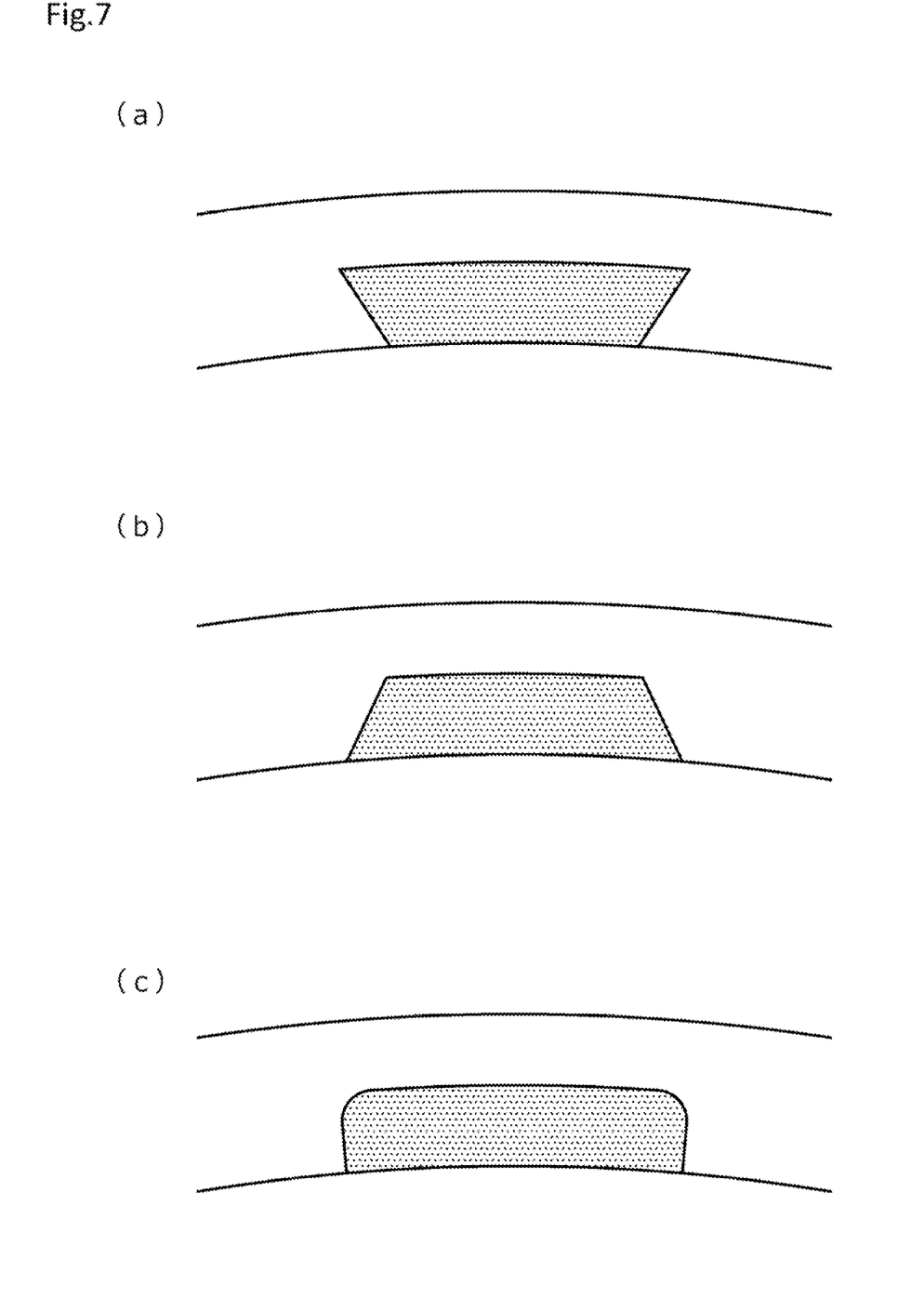
FIG. 7 is a diagram illustrating third to fifth modification examples of the groove formed in the sliding surface of the side seal in the embodiment.

In addition, the corner portion may be angular with an obtuse angle as in a fourth modification example illustrated in FIG. 7B.

In addition, the corner portion may be formed in a circular arc shape as in a fifth modification example illustrated in FIG. 7C. It should be noted that the grooves of the third to fifth modification examples may be open on the space on the outer diameter side as in the first modification example or may be alternately open on the spaces on the inner and outer diameter sides as in the second modification example.

In addition, the groove 70 is not limited to the circumferentially long groove. The groove 70 may be short in the circumferential direction or the first and second side wall surfaces of the groove may have the same length.

In addition, although an aspect in which the groove 70 formed in the sliding surface 7a of the side seal 7 is open toward the back pressure chamber 50 higher in pressure than the low-pressure chamber 20 has been described in the above embodiment, the present invention is not limited thereto and the groove may be open toward the low-pressure chamber 20. In addition, insofar as the sliding component of the present invention has a sliding surface relatively sliding with eccentric rotation, the sliding component of the present invention may be used in an environment in which the pressure inside the sliding surface and the pressure outside the sliding surface are substantially the same without being limited to an environment in which the pressure inside the sliding surface and the pressure outside the sliding surface differ from each other. In addition, the sliding component of the present invention does not have to function as a seal and may be one capable of reducing friction on a sliding surface.

In addition, although the side seal 7 having the relatively sliding surface 7a is made of resin and the thrust plate 8 having the relatively sliding surface 8a is made of metal in the above embodiment, the material of the sliding component may be freely selected in accordance with the environment of use and so on.

In addition, although an aspect in which the groove 70 is formed in the sliding surface 7a of the side seal 7 has been described in the above embodiment, the present invention is not limited thereto. A groove may be formed in the sliding region of the sliding surface 8a of the thrust plate 8 (see FIG. 3), which is a sliding component having a sliding surface relatively sliding with eccentric rotation. In addition, grooves may be formed in both the sliding surface 7a of the side seal 7 and the sliding surface 8a of the thrust plate 8.

In addition, although a configuration in which the sliding surface 7a of the side seal 7 as a sliding component and the sliding surface 8a of the thrust plate 8 as a sliding component slide relative to each other with eccentric rotation has been described in the above embodiment, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

REFERENCE SIGNS LIST

1 Housing
2 Rotary shaft
2a Eccentric portion
3 Inner casing
4 Scroll compression mechanism 6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll
42 Movable scroll
50 Back pressure chamber
70 Groove
70a First side wall surface (circular arc surface)
70b Bottom surface
70c Second side wall surface (radial surface)
70d Corner portion
107 Side seal (sliding component)
107a Sliding surface
170 Groove
207 Side seal (sliding component)
207a Sliding surface
270A Groove
270B Groove
C Scroll compressor
M Drive motor
Q Center

The invention claimed is:

1. An eccentric sliding assembly comprising:
a first sliding component having an annular shape with high-pressure and low-pressure fluids facing inside and outside of the sliding component and having a sliding surface;
a second sliding component having a sliding surface;
an eccentric driving device configured to slide the sliding surface of the first sliding component with respect to the sliding surface of the second sliding surface such that a center of the first sliding component imaginarily draws a circle which is eccentric with respect to a center of the second sliding component while keeping a non-rotation state of the first sliding component with respect to the center of the first sliding component in a plan view, or configured to slide the sliding surface of the second sliding component with respect to the sliding surface of the first sliding surface such that a center of the second sliding component imaginarily draws a circle which is eccentric with respect to a center of the first sliding component while keeping a non-rotation state of the second sliding component with respect to the center of the second sliding component in a plan view, wherein
the whole of the sliding surface of the first sliding component is disposed within the sliding surface of the second sliding component in the plan view while the sliding surface of the first sliding component slides relatively to the sliding surface of the second sliding component,
the sliding surface of the first sliding component is provided with a plurality of grooves each having an opening which is open only to a fluid space on any one of an inner diameter side and an outer diameter side of the sliding surface and arranged in a circumferential direction,
each of the grooves is partially defined by a bottom surface, a first side wall surface extending in a circumferential direction and intersecting with the bottom surface and the sliding surface provided with the grooves, and a pair of second side wall surfaces extending from both sides of the bottom surfaces to the opening of each of the grooves in a radial direction and intersecting with the bottom surface and the sliding surface provided with the grooves, and
the first side wall surface is connected to each of the second side wall surfaces.

2. The eccentric sliding assembly according to claim 1, wherein each of the grooves has a corner portion formed by an end of the first side wall surface and an end of each of the second side wall surfaces, the corner portion being angular.

3. The eccentric sliding assembly according to claim 2, wherein the first side wall surface is a circular arc surface having a circular center which coincides with a center of the sliding surface provided with the grooves and each of the second side wall surface is a radial surfaces extending from the center of the sliding surface provided with the grooves.

4. The eccentric sliding assembly according to claim 2, wherein each of the grooves has a circumferential length larger than a radial length thereof.

5. The eccentric sliding assembly according to claim 2, wherein each of the grooves is open to a space on the inner diameter side.

6. The eccentric sliding assembly according to claim 2, wherein each of the grooves is open to a space on a high-pressure side.

7. The eccentric sliding assembly according to claim 2, wherein the first sliding component has a radial width smaller than a radial width of the second sliding component.

8. The eccentric sliding assembly according to claim 1, wherein the first side wall surface is a circular arc surface having a circular center which coincides with a center of the sliding surface provided with the grooves and each of the second side wall surfaces is a radial surfaces extending from the center of the sliding surface provided with the grooves.

9. The eccentric sliding assembly according to claim 8, wherein each of the grooves has a circumferential length larger than a radial length thereof.

10. The eccentric sliding assembly according to claim 8, wherein each of the grooves is open to a space on the inner diameter side.

11. The eccentric sliding assembly according to claim 8, wherein each of the grooves is open to a space on a high-pressure side.

12. The eccentric sliding assembly according to claim 8, wherein the first sliding component has a radial width smaller than a radial width of the second sliding component.

13. The eccentric sliding assembly according to claim 1, wherein each of the grooves has a circumferential length larger than a radial length thereof.

14. The eccentric sliding assembly according to claim 13, wherein each of the grooves is open to a space on the inner diameter side.

15. The eccentric sliding assembly according to claim 13, wherein each of the grooves is open to a space on a high-pressure side.

16. The eccentric sliding assembly according to claim 13, wherein the first sliding component has a radial width smaller than a radial width of the second sliding component.

17. The eccentric sliding assembly according to claim 1, wherein each of the grooves is open to a space on the inner diameter side.

18. The eccentric sliding assembly according to claim 17, wherein each of the grooves is open to a space on a high-pressure side.

19. The eccentric sliding assembly according to claim 1, wherein each of the grooves is open to a space on a high-pressure side.

20. The eccentric sliding assembly according to claim 1, wherein the first sliding component has a radial width smaller than a radial width of the second sliding component.

21. The eccentric sliding assembly according to claim 1, wherein at least part of the grooves is open to both of a space on the inner diameter side and a space on the outer diameter side.

* * * * *